(12) United States Patent
Gherardi et al.

(10) Patent No.: US 10,017,074 B2
(45) Date of Patent: Jul. 10, 2018

(54) SYSTEM FOR PILOTING AN ELECTRIC MOTOR IN ELECTRIC MOTORCYCLES OR THE LIKE

(71) Applicant: Energica Motor Company S.p.A., Modena (IT)

(72) Inventors: Giovanni Gherardi, Modena (IT); Giampiero Testoni, Modena (IT); Simone Martinelli, Modena (IT); Eleonora Montanari, Modena (IT)

(73) Assignee: Energica Motor Company S.p.A., Modena (IT)

( * ) Notice: Subject to any disclaimer, the term of this patent is extended or adjusted under 35 U.S.C. 154(b) by 0 days.

(21) Appl. No.: 15/520,421

(22) PCT Filed: Oct. 27, 2015

(86) PCT No.: PCT/IB2015/058260
§ 371 (c)(1),
(2) Date: Apr. 20, 2017

(87) PCT Pub. No.: WO2016/067187
PCT Pub. Date: May 6, 2016

(65) Prior Publication Data
US 2017/0313207 A1 Nov. 2, 2017

(30) Foreign Application Priority Data
Oct. 27, 2014 (IT) .............................. MO2014A0307

(51) Int. Cl.
*H02P 6/00* (2016.01)
*B60L 15/20* (2006.01)
(Continued)

(52) U.S. Cl.
CPC ................. *B60L 15/20* (2013.01); *B60L 3/00* (2013.01); *B60L 7/10* (2013.01); *B60L 11/18* (2013.01); *B60L 7/00* (2013.01); *B60L 15/00* (2013.01)

(58) Field of Classification Search
CPC .... B60L 15/20; B60L 3/00; B60L 7/10; B60L 11/18; B60L 7/00; B60L 15/00
(Continued)

(56) References Cited

U.S. PATENT DOCUMENTS

2013/0147417 A1  6/2013 Kim et al.
2013/0270025 A1* 10/2013 Matsuda ................ B62K 11/04
                                                    180/220
(Continued)

FOREIGN PATENT DOCUMENTS

EP  2644435  10/2013
EP  2644439  10/2013
(Continued)

OTHER PUBLICATIONS

International Search Report and the Written Opinion dated Feb. 11, 2016 From the International Searching Authority Re. Application No. PCT/IB2015/058260.

*Primary Examiner* — Eduardo Colon Santana
*Assistant Examiner* — Gabriel Agared

(57) ABSTRACT

The system (1) for piloting an electric motor in electric motorcycles or the like is operatively connectable to a control inverter (I) of an electric motor (E) of an electric motorcycle (M) and to a control device (C) of the acceleration of the electric motorcycle (M) and comprises dynamic generation means (10) of a piloting signal ($T_{OUT}$) of the inverter (I) according to a control signal (G) coming from the control device (C) and to at least a maximum deliverable/
(Continued)

absorbable current value ($I_{MAX}$, $RI_{MAX}$) by an electric battery (B) of the electric motorcycle (M).

12 Claims, 4 Drawing Sheets

(51) Int. Cl.
  *B60L 11/18* (2006.01)
  *B60L 7/10* (2006.01)
  *B60L 3/00* (2006.01)
  *B60L 7/00* (2006.01)
  *B60L 15/00* (2006.01)

(58) Field of Classification Search
  USPC .......................................................... 318/700
  See application file for complete search history.

(56) References Cited

U.S. PATENT DOCUMENTS

2013/0270938 A1* 10/2013 Matsuda .................. B60K 1/00
                                                                  310/54
2015/0367907 A1* 12/2015 Bland ...................... B62M 7/02
                                                                  180/216
2016/0304151 A1* 10/2016 Di Benedetto .......... B62M 7/12

FOREIGN PATENT DOCUMENTS

EP           2662921          11/2013
WO    WO 2016/067187         5/2016

\* cited by examiner

SYSTEM FOR PILOTING AN ELECTRIC MOTOR IN ELECTRIC MOTORCYCLES OR THE LIKE

RELATED APPLICATIONS

This application is a National Phase of PCT Patent Application No. PCT/IB2015/058260 having International filing date of Oct. 27, 2015, which claims the benefit of priority of Italian Patent Application No. MO2014A000307 filed on Oct. 27, 2014. The contents of the above applications are all incorporated by reference as if fully set forth herein in their entirety.

FIELD AND BACKGROUND OF THE INVENTION

The present invention relates to a system for piloting an electric motor in electric motorcycles or the like.

The use is well known and increasingly more common of motorcycles with electric propulsion.

The electric motorcycles of known type comprise an electric motor, normally made up of a single-phase alternating current motor or of a brushless motor, a rechargeable electric battery and an inverter connected to the electric battery and able to control the electric motor.

In practice, the inverter receives a signal from the throttle knob of the electric motorcycle, and converts this received signal into a corresponding supply current/voltage of the electric motor.

Furthermore, during this phase of power delivery to the electric motor, the inverter takes a predetermined current from the electric battery and appropriately converts it into power supplied to the electric motor.

Furthermore, electric motorcycles of the known type may have a regenerating system, i.e., a system able to recover energy during slowing down/braking of the motorcycle in order to use it to recharge the electric battery.

Consequently, during slowing down and/or braking the recovered energy translates into a current sent to the electric battery of the motorcycle, to recharge the battery itself.

The electric propulsion systems of known type do however require a number of devices.

It can occur in fact that the current required from the inverter to the electric battery, determined according to the signal received from the throttle knob, exceeds a preset maximum value of the current deliverable at output, with consequent malfunction of the electric propulsion system, or even, in some cases, damage to the battery itself.

Similarly, during braking, the current sent to the electric battery may exceed a maximum preset value of charging current at input.

In order to prevent this drawback, the use is known on electric motorcycles of BMS (Battery Monitoring System) electronic systems to manage the rechargeable batteries.

In particular, such BMS systems are used to carry out a continuous monitoring of the state of the battery and to keep the battery within the so-called Safe Operating Area (SOA), i.e., within those current and voltage operating conditions such as to avoid any risk of damage.

In general, the BMS systems of known type permit monitoring the battery operating parameters such as voltage, output or input current, temperature, charge level and, furthermore, are able to perform the dynamic calculation of the maximum permissible current charge values at input and of delivered current at output.

The overcurrent protection (both during charging and during the delivery of current) is commonly effected by means of an internal switch able to be operated and then opened by the BMS system in the event of a current exceeding the maximum allowed value being detected.

Furthermore, an appropriate signal can be sent to the devices connected to the battery, so as to require a limitation or interruption of the use of the battery.

The use of the BMS systems of known type, however, entails some drawbacks.

In particular, the protection of the battery is operated 'a posteriori', i.e., only once the BMS system has detected the presence of overcurrent, and is done by means of sudden limitations of the current delivered by the electric battery, or even, by means of interruption of the battery connection itself.

This results in an inconvenience and greater riding difficulty for the user who, besides receiving and having to manage the warning messages displayed on the motorcycle monitor, is forced in many cases to recharge the battery within a very short time.

SUMMARY OF THE INVENTION

The main aim of the present invention is to provide a system for piloting an electric motor in electric motorcycles or the like which allows effectively maintaining the battery within those current and voltage operating conditions such as to avoid any risk of damage, while at the same time eliminating discomfort for the user while riding the motorcycle.

Another object of the present invention is to provide a system for piloting an electric motor in electric motorcycles or the like which allows to overcome the mentioned drawbacks of the prior art within the ambit of a simple, rational, easy, effective to use and affordable solution.

The objects stated above are achieved by the present system for piloting an electric motor in electric motorcycles or the like, having the characteristics of claim 1.

BRIEF DESCRIPTION OF THE SEVERAL VIEWS OF THE DRAWINGS

Other characteristics and advantages of the present invention will become better evident from the description of a preferred, but not exclusive, embodiment of a system for piloting an electric motor in electric motorcycles or the like, illustrated by way of an indicative, but non-limiting, example in the accompanying drawings, in which.

DESCRIPTION OF SPECIFIC EMBODIMENTS OF THE INVENTION

Figure 1:
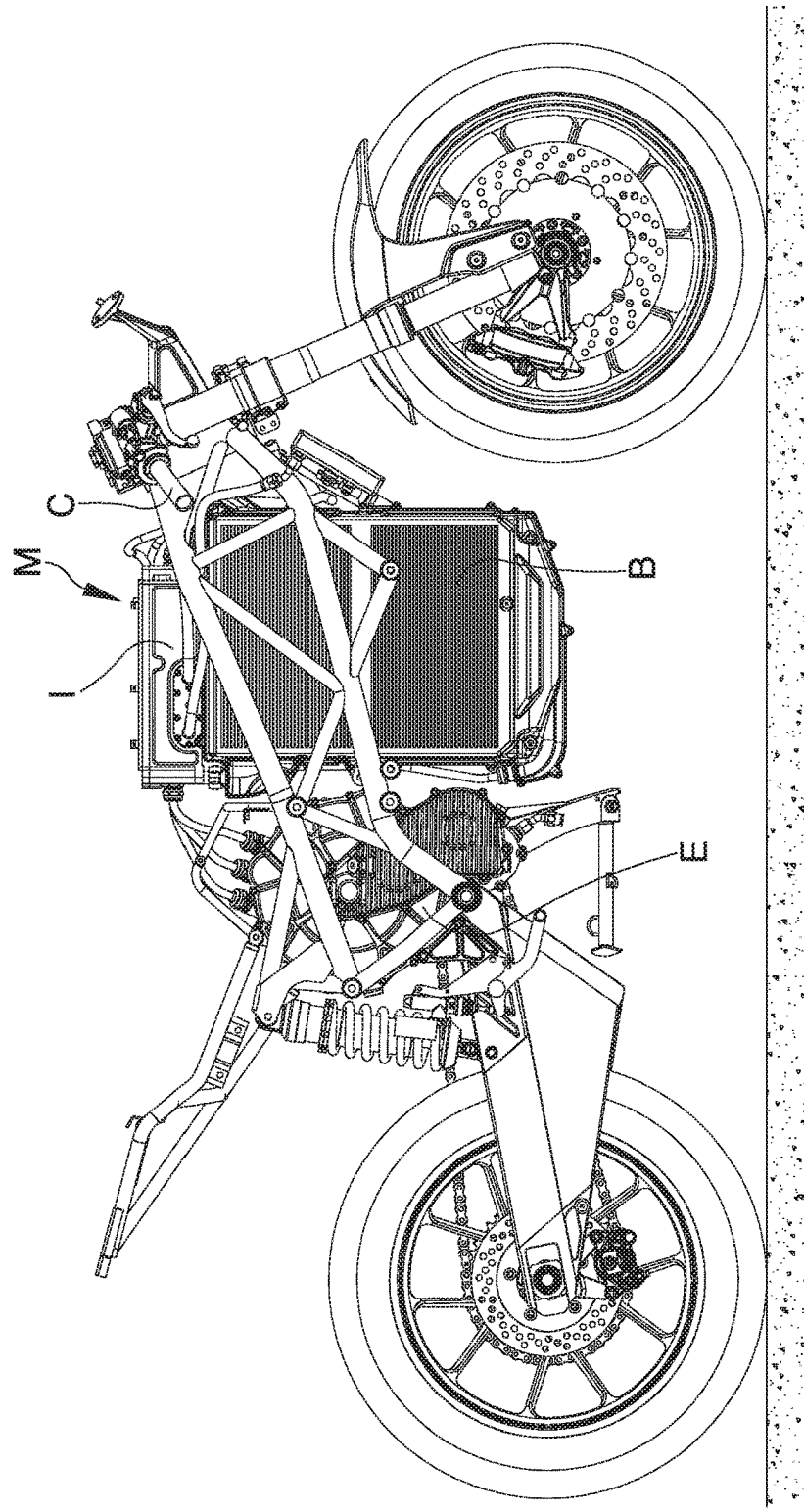
FIG. 1 is a side view of an electric motorcycle having system according to the invention.

With particular reference to such figures, reference number 1 globally designates a system for piloting an electric motor in electric motorcycles or the like.

The system 1 is implemented by means of a plurality of hardware and/or software components suitably interfaced with one another.

Specifically, the system 1 can be made integrated inside the electronic control unit of an electric motorcycle M (or in the electronics in general of the motorcycle itself) or, alternatively, can be implemented by means of a specific electronic control unit installable on board the electric motorcycle M.

The system 1 comprises an output 2 connectable to a control inverter I of an electric motor E of the electric motorcycle M. The output 2 is able to send a piloting signal TOUT to the inverter I.

The inverter I can be made up of an inverter of the conventional type connected to a rechargeable electric battery B of the electric motorcycle M and able to control the electric motor E in accordance with the piloting signal TOUT.

Preferably, the piloting signal $T_{OUT}$ sent to the inverter I corresponds to a torque value delivered by the electric motor E.

Usefully, the system 1 can be used both during an active operating phase and during a regeneration phase of the electric battery B.

In particular, it is pointed out that during the active operating phase the inverter I picks up a predetermined current from the electric battery B and appropriately converts it into power delivered to the electric motor E.

During the regeneration phase instead (usually during slowing down and/or braking of the electric motorcycle M) the recovered energy translates into a current sent from the inverter I to the electric battery B, to recharge the battery itself.

The system 1 comprises a first input 3 connectable to a control device C that controls the acceleration of the electric motorcycle M, composed of the throttle knob. The first input 3 is able to receive a control signal G coming from the electronics of the knob C and correlated to the angular position of the knob itself.

The system 1 comprises a second input 4 able to receive an output voltage value VB of the electric battery B. More specifically, such output voltage VB may vary according to the usage conditions and the temperature of the electric battery B.

The system 1 comprises a third input 5 able to receive a rotation speed value RPM of the electric motor E.

The system 1 also comprises:
a fourth input 6 able to receive a maximum deliverable current dynamic value IMAX_BMS;
a fifth input 7 able to receive a maximum absorbable current dynamic value RIMAX_BMS.

In particular, such dynamic values IMAX_BMS and RIMAX_BMS represent, respectively, the maximum deliverable current and the maximum absorbable current by the electric battery B, and are preferably calculated by a BMS (Battery Monitoring System) type system or by a similar system installed on the electric motorcycle M, according to the temperature and/or the charge level of the electric battery B.

Different embodiments cannot however be ruled out wherein, e.g., the maximum deliverable current dynamic value IMAX_BMS and the maximum absorbable current dynamic value RIMAX_BMS are directly determined by the system 1.

It is further pointed out that in the present description, by the term "maximum deliverable current" is meant the maximum current that can be delivered by the electric battery B during an active phase without malfunctions or damage to the battery itself.

Similarly, it is specified that by the term "maximum absorbable current" is meant the maximum current that can be absorbed by the electric battery B during a regeneration phase without malfunctions or damage to the battery itself.

Usefully, the system 1 can comprise a sixth input 8 and a seventh input 9 able to receive selection signals of the delivery/regeneration modes MapIN, RMapIN able to select different operating modes of the electric motorcycle M during the active phase or during the regeneration phase, respectively.

Figure 2:
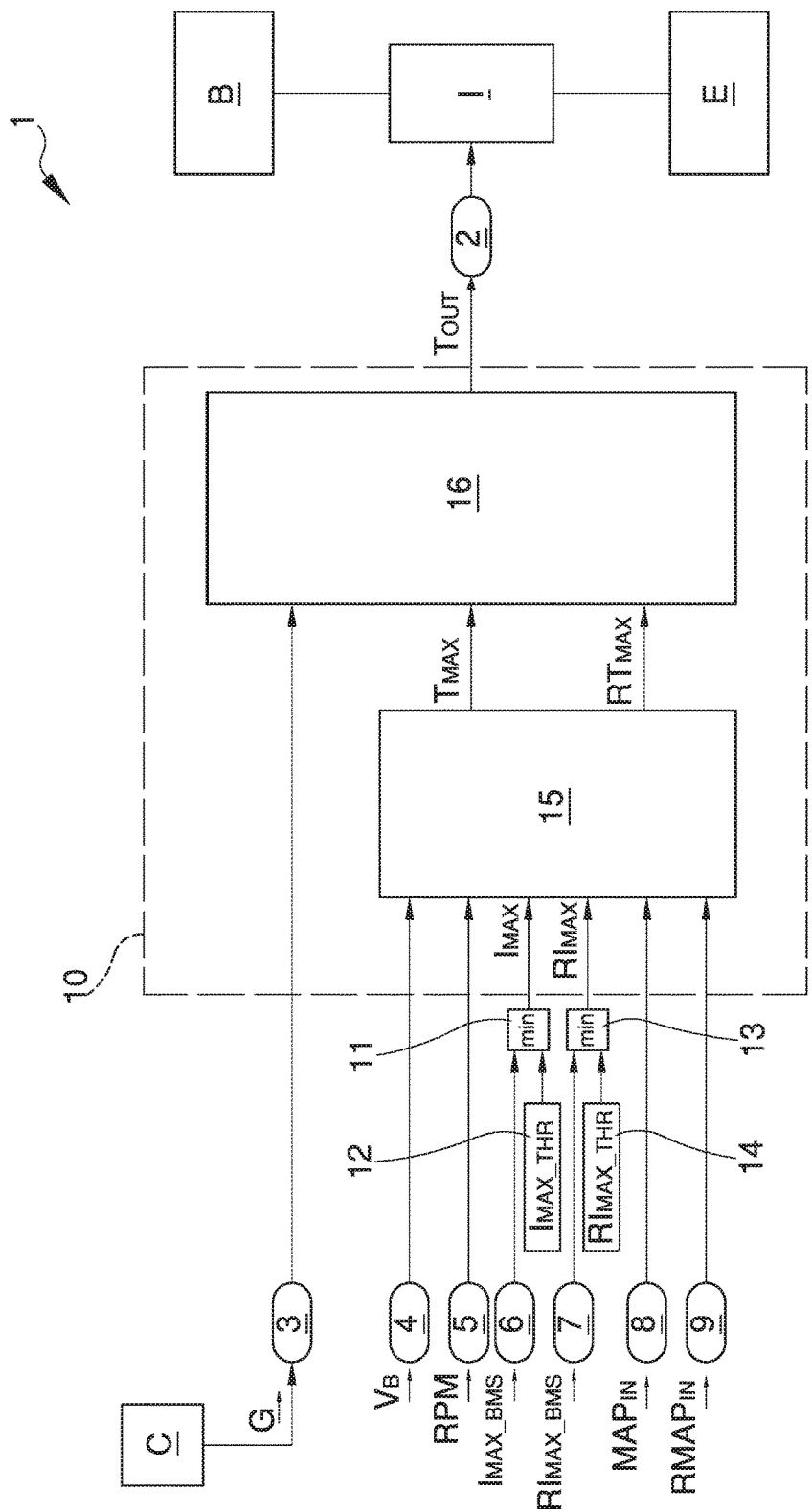
FIG. 2 is a general block diagram of the system according to the invention.

Advantageously, the system 1 comprises dynamic generation means of the delivered torque value TOUT sent to the inverter I, indicated altogether in FIG. 2 by reference number 10.

In particular, during the active phase, such dynamic generation means 10 are able to dynamically generate the delivered torque value TOUT according to the control signal G coming from the knob C and to a maximum deliverable current value IMAX of the electric battery B of the electric motorcycle M.

In a similar manner, during the regeneration phase, such dynamic generation means 10 are able to dynamically generate the delivered torque value TOUT according to the control signal G coming from the knob C and to a maximum absorbable current value RIMAX of the electric battery B of the electric motorcycle M.

Usefully, the maximum deliverable current value IMAX can be determined as the lesser of a maximum threshold value IMAX_THR and the maximum deliverable current dynamic value IMAX_BMS calculated by the BMS system.

In such a case, the system 1 has a first selection unit 11 able to select the lesser of the maximum threshold value $I_{MAX\_THR}$ stored within a first memory unit 12 and the maximum deliverable current dynamic value $I_{MAX\_BMS}$ coming from the fourth input 6. The first selection unit 11, then, returns at output the maximum deliverable current value $I_{MAX}$ and sends it to the dynamic generation means 10.

Similarly, the maximum absorbable current value RIMAX can be determined as the lesser of a maximum threshold value RIMAX_THR and the maximum absorbable current dynamic value RIMAX_BMS calculated by the BMS system.

In such a case, the system 1 has a second selection unit 13 able to select the lesser of the maximum threshold value $RI_{MAX\_THR}$ stored within a second memory unit 14 and the maximum absorbable current dynamic value $RI_{MAX\_BMS}$ coming from the fifth input 7. The second selection unit 13, then, returns at output the maximum absorbable current value $RI_{MAX}$ and sends it to the dynamic generation means 10.

Different embodiments cannot however be ruled out wherein the fourth input 6 and/or the fifth input 7 are directly connected to the dynamic generation means 10.

Advantageously, the dynamic generation means 10 comprise a first calculation unit 15 able to calculate a maximum deliverable torque value $T_{MAX}$ according to the maximum deliverable current value $I_{MAX}$, to the output voltage value $V_B$ and to the rotation speed value RPM.

Similarly, the first calculation unit 15 is able to calculate a maximum regeneration torque value RTMAX according to the maximum absorbable current value RIMAX, to the output voltage value VB and to the rotation speed value RPM.

Moreover, the dynamic generation means 10 comprise a second calculation unit 16 able to calculate the delivered torque value $T_{OUT}$ to be sent to the inverter I as a function of the maximum deliverable torque value $T_{MAX}$, of the maximum regeneration torque value $RT_{MAX}$ and of the control signal G.

Preferably, the delivered torque value TOUT varies between a maximum value equal to the maximum deliverable torque value TMAX and a minimum value equal to the maximum regeneration torque value RTMAX, while all the intermediate values are appropriately determined.

For example, the control signal G may be composed of a signal variable between 0 and 1, where zero corresponds to the minimum rotation angle of the throttle knob C, while 1 corresponds to the maximum rotation angle of the throttle knob C.

In such a case, the delivered torque value TOUT may be obtained using the following formula:

$$T_{OUT}=[G*(T_{MAX}+RT_{MAX})-RT_{MAX}], \text{ where } 0 \leq G \leq 1.$$

This way, with G=0 the delivered torque value TOUT corresponds to the maximum regeneration torque value RTMAX while with G=1 the delivered torque value TOUT corresponds to the maximum delivered torque value TMAX.

Figure 3:
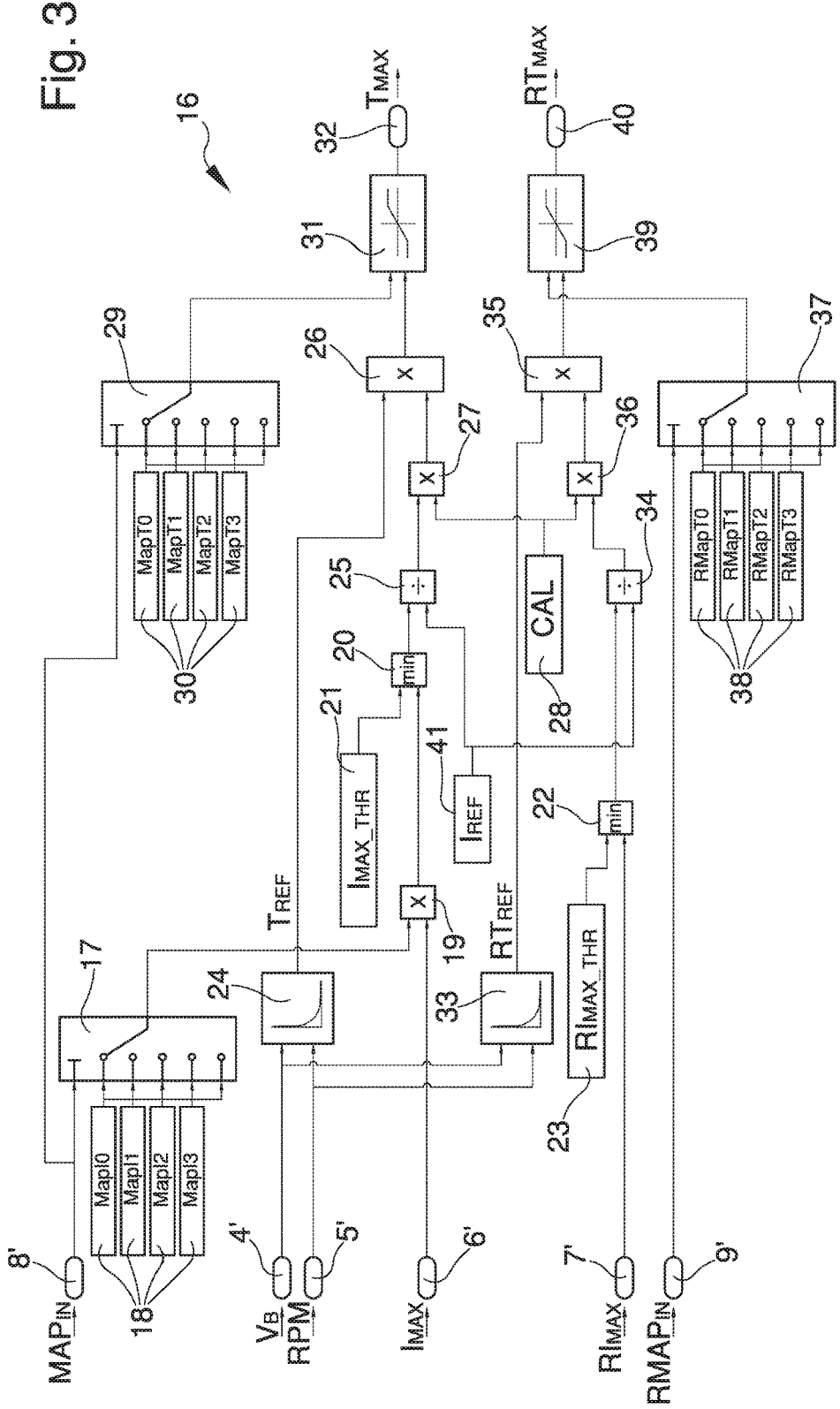
FIG. 3 is a block diagram that illustrates in detail a first calculation unit of the system according to the invention.

A possible embodiment of the first calculation unit 15 is shown in FIG. 3 and is described in detail below.

The first calculation unit 15 comprises:
- a first input 4' connected to the second input 4 of the system 1 and able to receive the output voltage value $V_B$;
- a second input 5' connected to the third input 5 of the system 1 and able to receive the rotation speed value RPM of the electric motor E;
- a third input 6' connected to the output of the first selection unit 11 and able to receive the maximum deliverable current value $I_{MAX}$;
- a fourth input 7' connected to the output of the second selection unit 13 and able to receive the maximum absorbable current value $RI_{MAX}$;
- a fifth input 8' connected to the sixth input 8 of the system 1 and able to receive the selection signal of the delivery modes $Map_{IN}$;
- a sixth input 9' connected to the seventh input 9 of the system 1 and able to receive the selection signal of the regeneration modes $RMap_{IN}$.

Usefully, the first calculation unit 15 can comprise first selection means 17 able to select one of a plurality of different current multiplication coefficients MapI0, MapI1, MapI2, MapI3 stored inside respective first storage means 18 and corresponding to different operating modes of the electric motorcycle M. In particular, the coefficients MapI0, MapI1, MapI2, MapI3 can be selected by means of the selection signal of the delivery modes MapIN at input of the first selection means 17.

A first multiplication unit 19 is able to multiply the maximum deliverable current value $I_{MAX}$ by the selected coefficient MapI0, MAPI1, MapI2, MapI3.

Preferably, the value of each of the coefficients MapI0, MapI1, MapI2, MapI3 is between 0 and 1 and is able to reduce the maximum deliverable current value IMAX by a predefined percentage.

Furthermore, in order to ensure greater redundancy and therefore greater control, the first calculation unit 15 may have a first supplementary selection unit 20 able to compare a maximum threshold value IMAX_THR stored inside a first storage unit 21 with the maximum deliverable current value IMAX coming from the first multiplication unit 19 and to select the lesser of the two values.

Similarly, the first calculation unit 15 may have a second supplementary selection unit 22 able to compare a maximum threshold value RIMAX_THR stored inside a second storage unit 23 with the maximum absorbable current value IMAX coming from the input 7' and to select the lesser of the two values.

Preferably, as shown in the particular embodiment of FIG. 3, the first calculation unit 15 comprises:
- a first processing logic composed of all the hardware and software components able to calculate the maximum deliverable torque TMAX during the active operating phase of the system 1;
- a second processing logic composed of all the hardware and software components able to calculate the maximum regeneration torque RTMAX during the regeneration operating phase of the system 1.

Described below in detail are the structure and components of the first processing logic of the maximum deliverable torque TMAX.

Advantageously, the first calculation unit 15 comprises a first determination unit 24 able to determine a reference delivered torque value TREF according to the output voltage value VB, to the rotation speed value RPM and to a predefined reference current value IREF.

In particular, the first determination unit 24 comprises storage means of a plurality of predefined ratios between reference delivered torque values $T_{REF}$, output voltage values $V_B$ and rotation speed values RPM, wherein such predefined ratios are predetermined considering a current delivered by the electric battery B equal to the aforementioned predefined reference current value $I_{REF}$.

Figure 4:
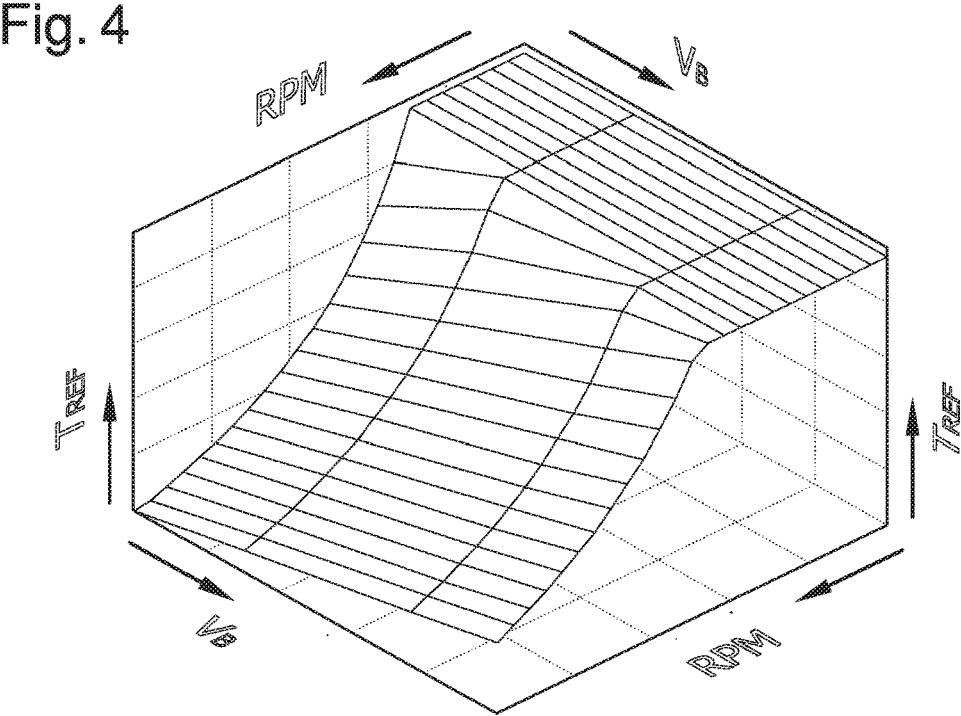
FIG. 4 is a diagram showing possible ratios between the output voltage values of the motorcycle electric battery, rotation speed values of the motorcycle electric motor and torque values of the electric motor, which are predetermined considering a current delivered by the electric battery equal to a reference current value.

By way of example, FIG. 4 shows a diagram illustrating such possible predefined ratios.

In particular, the diagram shows, on three distinct axes, possible output voltage values VB, rotation speed values RPM and reference delivered torque values TREF and graphically illustrates the trend of the three quantities, determined considering a current delivered by the electric battery equal to the predefined reference current value IREF.

Again by way of example only, the trend of the three variables TREF, VB and RPM shown in FIG. 4 is determined considering a reference current IREF equal to 100 A.

In addition, the first calculation unit 15 comprises a first division unit 25 able to divide the maximum delivered current value $I_{MAX}$ by the reference current value $I_{REF}$ and is able to return at output a multiplier parameter MLP1.

In particular, the multiplier parameter MLP1 is determined using the following formula:

$$MLP1=I_{MAX}/I_{REF}$$

where:
MLP1 is the multiplier parameter determined during the active operating phase of the system 1;
$I_{MAX}$ is the maximum deliverable current value; and
$I_{REF}$ is the reference current value.

Usefully, the reference current value IREF can be stored inside an appropriate storage unit 41.

A second multiplication unit 26 is able to multiply the reference torque value TREF determined by means of the determination unit 24 by the multiplier parameter MLP1 at output from the first division unit 25, in order to obtain the maximum delivered torque value TMAX.

In particular, the maximum deliverable torque value $T_{MAX}$ is determined using the following formula:

$$T_{MAX}=T_{REF}*MLP1$$

where:

$T_{MAX}$ is the maximum deliverable torque value;
$T_{REF}$ is the reference torque value determined during the active operating phase; and
MLP1 is the multiplier parameter determined during the active operating phase.

This way, because said IREF (value preset and stored in the system) is equal to 100 A and the current IMAX (dynamic value variable according to the conditions of use) is equal to 90 A, then:

MLP1=0.9

TMAX=TREF*0.9

In other words TMAX is obtained by scaling TREF in proportion to the ratio between IMAX, and IREF.

Usefully, the first calculation unit 15 can comprise a third multiplication unit 27, placed between the first division unit 25 and the second multiplication unit 26, able to multiply the multiplier parameter MLP1 by a predefined calibration coefficient CAL, stored inside a third storage unit 28.

In particular, such calibration coefficient CAL can be determined according to the specific characteristics of the electric motor E to be piloted.

The first calculation unit 15 may also comprise first setting means 29 of a torque limit value selected among a plurality of torque limit values MapT0, MapT1, MapT2, MapT3.

Each of the torque limit values MapT0, MapT1, MapT2, MapT3 is stored inside respective second storage means 30 and corresponds to a different operating mode of the electric motorcycle M.

A first limitation unit 31 is able to limit the maximum torque value $T_{MAX}$ determined according to the selected torque limit value MapT0, MapT1, MapT2, MapT3.

For example, the first limitation unit 31 can be made up of a specific filter.

The first calculation unit 15 comprises a first output 32 of the maximum deliverable torque value TMAX determined and, if necessary, limited.

Described below in detail is the second processing logic of the first calculation unit 15, composed of all the hardware and software components able to operate during the regeneration operating phase of the system 1 for the calculation of the maximum regeneration torque RTMAX.

Advantageously, the first calculation unit 15 comprises a second determination unit 33 able to determine a reference regeneration torque value RTREF according to the output voltage value VB, to the rotation speed value RPM and to a predefined reference current value IREF.

In particular, the second determination unit 33 comprises storage means for storing a plurality of predefined ratios between reference regeneration torque values RTREF, output voltage values VB and rotation speed values RPM, wherein such predefined ratios are predetermined considering a current absorbed by the electric battery B equal to the above reference current value IREF.

Figure 5:
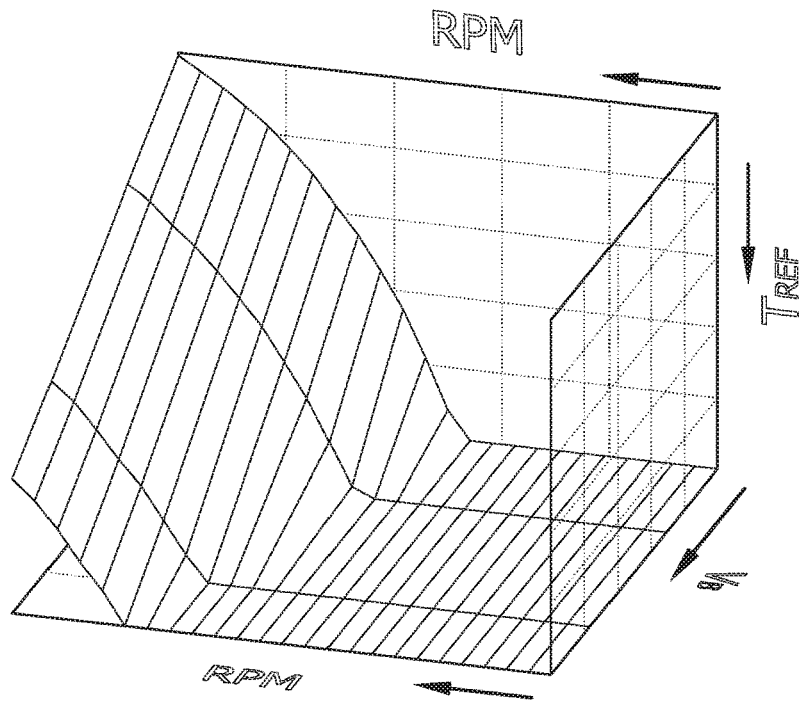
FIG. 5 is a diagram showing possible ratios between the output voltage values of the motorcycle electric battery, rotation speed values of the motorcycle electric motor and torque values of the electric motor, which are predetermined considering a current absorbed by the electric battery equal to a reference current value.

By way of example, FIG. 5 shows a diagram illustrating such possible predefined ratios.

In particular, the diagram shows, on three distinct axes, possible output voltage values VB, rotation speed values RPM, and reference regeneration torque values RTREF and graphically illustrates the trend of the three quantities, determined considering a current absorbed by the electric battery B equal to the reference current value IREF.

Always by way of example only, the trend of the three variables RTREF, VB and RPM shown in FIG. 4 is determined considering a reference current IREF equal to 100 A.

Furthermore, the first calculation unit 15 comprises a second division unit 34 able to divide the maximum absorbed current value RIMAX by the reference absorbed current value IREF and able to return a multiplier parameter MLP2 at output.

In particular, the multiplier parameter MLP2 is determined using the following formula:

$$MLP2=RI_{MAX}/I_{REF}$$

where:

MLP2 is the multiplier parameter determined during the regeneration operating phase of the system 1;
$RI_{MAX}$ is the maximum absorbable current value; and
$I_{REF}$ is the reference current value.

A fourth multiplication unit 35 is able to multiply the reference regeneration torque value RTREF determined by the second determination unit 33 by the multiplier parameter MLP2 at output from the second division unit 34, in order to obtain the maximum regeneration torque value RTMAX.

In particular, the maximum regeneration torque value RTMAX is determined using the following formula:

$$RT_{MAX}=RT_{REF}*MLP2$$

where:

RTMAX is the maximum regeneration torque value;
$RT_{REF}$ is the reference torque value determined during the regeneration operating phase; and
MLP2 is the multiplier parameter determined during the regeneration operating phase.

Usefully, the first calculation unit 15 can comprise a fifth multiplication unit 36, placed between the second division unit 34 and the fourth multiplication unit 35, able to multiply the multiplier parameter MLP2 by the predefined calibration coefficient CAL, stored inside the second storage unit 23.

In particular, such calibration coefficient CAL can be determined according to the specific characteristics of the electric motor E to be piloted.

The first calculation unit 15 can also comprise second setting means 37 of a torque limit value selected from among a plurality of torque limit values RMapT0, RMapT1, RMapT2, RMapT3.

Each of the torque limit values RMapT0, RMapT1, RMapT2, RMapT3 is stored inside respective third storage means 38 and corresponds to a different operating mode of the electric motorcycle M.

A second limitation unit 39 is able to limit the maximum regeneration torque value RTMAX according to the selected limit torque value RMapT0, RMapT1, RMapT2, RMapT3.

For example, the second limitation unit 39 can be made up of a suitable filter.

The first calculation unit 15 comprises a second output 40 of the maximum regeneration torque value RTMAX determined and, if necessary, limited.

The operation of the system 1 according to the invention is described below.

With reference to the operation of the system 1 during the active phase, the first calculation unit 15 receives at input the output voltage value VB, the rotation speed value RPM, the maximum deliverable current value IMAX and, if necessary, the selection signal of the delivery modes MAPIN.

By means of the first determination unit 24, the first calculation unit 15 determines the reference delivered torque value TREF. In particular, such value is determined considering predefined ratios between reference delivered torque values TREF, output voltage values VB and rotation speed values RPM, predetermined considering a current delivered by the electric battery B equal to the reference current value IREF.

FIG. 4 shows a diagram which, by way of example, graphically illustrates the trend of the three quantities TREF, VB and RPM determined considering a current delivered by the electric battery equal to the predefined reference current value IREF (e.g. equal to 100 A).

Furthermore, the first calculation unit 15, by means of the first division unit 25, performs a division between the maximum delivered current value IMAX and the reference current value IREF and returns at output a multiplier parameter MLP1.

Subsequently, then, by means of the second multiplication unit 26, the first calculation unit 15 multiplies the determined reference torque value TREF by the multiplier parameter MLP1, obtaining the maximum delivered torque value TMAX.

The maximum delivered torque value TMAX so calculated is then sent to the input of the second calculation unit 16.

The operation of the system 1 during the regeneration phase is the same as the operation described above for the active phase.

Finally, the second calculation unit 16 dynamically performs the calculation of the delivered torque value TOUT to be sent to the inverter I according to the maximum deliverable torque value TMAX, to the maximum regeneration torque value RTMAX and to the control signal G.

It has in practice been ascertained how the described invention achieves the proposed objects.

In particular, the fact is underlined that the system according to the invention permits dynamically varying the delivered torque value sent to the inverter according to a control signal coming from the throttle knob and according to the maximum deliverable/absorbable current value by the electric battery.

Therefore, the system according to the invention effectively keeps the battery within those current and voltage operating conditions such as to avoid any risk of damage, while at the same time eliminating discomfort for the user while riding the motorcycle.

What is claimed is:

1. System (1) for piloting an electric motor in electric motorcycles or the like operatively connectable to at least a control inverter (I) of an electric motor (E) of an electric motorcycle (M) and to a control device (C) of the acceleration of said electric motorcycle (M), wherein said system (1) comprises:
   dynamic generation means (10) of at least a piloting signal ($T_{OUT}$) of said inverter (I) according to a control signal (G) coming from said control device (C) and to at least a maximum deliverable/absorbable current value ($I_{MAX}$, $RI_{MAX}$) by at least an electric battery (B) of said electric motorcycle (M),
   wherein said piloting signal ($T_{OUT}$) corresponds to a delivered torque value to said electric motor (E),
   wherein said dynamic generation means (10) comprise at least a first calculation unit (15) of at least a maximum deliverable and/or regeneration torque value ($T_{MAX}$, $RT_{MAX}$) according to said at least a maximum deliverable/absorbable current value ($I_{MAX}$, $RI_{MAX}$) by said electric battery (B), to an output voltage value ($V_B$) of said electric battery (B) and to a rotation speed value (RPM) of said electric motor (M), and
   wherein said delivered torque value is variable between said maximum deliverable torque value ($T_{MAX}$) and said maximum regeneration torque value ($RT_{MAX}$); wherein said delivered torque value ($T_{OUT}$) is calculated using the following formula:

$$T_{OUT}=[G^*(T_{MAX}+RT_{MAX})-RT_{MAX}], \text{ with } 0 \le G \le 1$$

where:
$T_{OUT}$ is said piloting signal;
G is said control signal;
$T_{MAX}$ is said maximum deliverable torque value; and
$RT_{MAX}$ is said maximum regeneration torque value.

2. System (1) according to claim 1, wherein said dynamic generation means (10) comprise at least a first calculation unit (15) of at least a maximum deliverable and/or regeneration torque value ($T_{MAX}$, $RT_{MAX}$) according to said at least a maximum deliverable/absorbable current value ($I_{MAX}$, $RI_{MAX}$) by said electric battery (B), to an output voltage value ($V_B$) of said electric battery (B) and to a rotation speed value (RPM) of said electric motor (M).

3. System (1) according to claim 2, wherein said dynamic generation means (10) comprise at least a second calculation unit (16) of said piloting signal ($T_{OUT}$) according to said maximum deliverable and/or regeneration torque value ($T_{MAX}$, $RT_{MAX}$) and to said control signal (G).

4. System (1) according to claim 1, wherein said first calculation unit (15) comprises at least a determination unit (24, 33) of at least a reference torque value ($T_{REF}$, $RT_{REF}$) according to said output voltage value ($V_B$), to said rotation speed value (RPM) and to at least a reference current value ($I_{REF}$).

5. System (1) according to claim 4, wherein said determination unit (24, 33) comprises storage means of a plurality of predefined ratios between reference torque values ($T_{REF}$, $RT_{REF}$), output voltage values ($V_B$) and rotational speed values (RPM), wherein said predefined ratios are predetermined considering a current delivered/absorbed by said electric battery (B) equal to said at least a reference current value ($I_{REF}$).

6. System (1) according to claim 2, wherein said first calculation unit (15) comprises first selection means (17) of at least a current multiplication coefficient (MapI0, MapI1, MapI2, MapI3) among a plurality of coefficients (MapI0, MapI1, MapI2, MapI3) corresponding to different operating modes of said electric motorcycle (M) and at least a multiplication unit (19) of said maximum deliverable/absorbable current value ($I_{MAX}$) by said selected multiplication coefficient (MapI0, MapI1, MapI2, MapI3).

7. System (1) according to claim 2, wherein said first calculation unit (15) comprises setting means (29, 37) of at least a maximum threshold torque value among a plurality of threshold values (MapT0, MapT1, MapT2, MapT3, RMapT0, RMapT1, RMapT2, RMapT3) corresponding to different operating modes of said electric motorcycle (M) and at least a limitation unit (31, 39) of said maximum torque value ($T_{MAX}$, $RT_{MAX}$) to said selected threshold value (MapT0, MapT1, MapT2, MapT3, RMapT0, RMapT1, RMapT2, RMapT3).

8. System (1) for piloting an electric motor in electric motorcycles or the like operatively connectable to at least a control inverter (I) of an electric motor (E) of an electric motorcycle (M) and to a control device (C) of the acceleration of said electric motorcycle (M), wherein said system (1) comprises dynamic generation means (10) of at least a piloting signal ($T_{OUT}$) of said inverter (I) according to a control signal (G) coming from said control device (C) and to at least a maximum deliverable/absorbable current value ($I_{MAX}$, $RI_{MAX}$) by at least an electric battery (B) of said electric motorcycle (M), wherein said dynamic generation means (10) comprise at least a first calculation unit (15) of at least a maximum deliverable and/or regeneration torque value ($T_{MAX}$, $RT_{MAX}$) according to said at least a maximum deliverable/absorbable current value ($I_{MAX}$, $RI_{MAX}$) by said electric battery (B), to an output voltage value ($V_B$) of said electric battery (B) and to a rotation speed value (RPM) of said electric motor (M), wherein said first calculation unit (15) comprises at least a determination unit (24, 33) of at least a reference torque value ($T_{REF}$, $RT_{REF}$) according to said output voltage value ($V_B$), to said rotation speed value (RPM) and to at least a reference current value ($I_{REF}$), wherein said first calculation unit (15) comprises at least a division unit (25, 34) of said maximum deliverable/absorbable current value ($I_{MAX}$, $RI_{MAX}$) over said reference current value ($I_{REF}$) to determine at least a multiplier parameter (MLP1, MLP2), said multiplier parameter (MLP1, MLP2) being determined using at least one of the following formulas:

$$MLP1 = I_{MAX}/I_{REF}$$

$$MLP2 = RI_{MAX}/I_{REF}$$

where:
MLP1 is said multiplier parameter determined during an active operating phase of said system (1);
MLP2 is said multiplier parameter determined during a regeneration operating phase of said system (1);
$I_{MAX}$ is said maximum deliverable current value;
$RI_{MAX}$ is said maximum absorbable current value; and
$I_{REF}$ is said reference current value.

9. System (1) according to claim 8, wherein said first calculation unit (15) comprises at least a multiplication unit (26, 35) between said reference torque value ($T_{REF}$, $RT_{REF}$) and said multiplier parameter (MLP1, MLP2) to obtain said maximum deliverable torque value ($T_{MAX}$) and said maximum regeneration torque value ($RT_{MAX}$), said maximum deliverable torque value ($T_{MAX}$) and said maximum regeneration torque value ($RT_{MAX}$) being determined using the following formulas:

$$T_{MAX} = T_{REF} * MLP1$$

$$RT_{MAX} = RT_{REF} * MLP2$$

where:
$T_{MAX}$ is said maximum deliverable torque value;
$T_{REF}$ is said reference torque value determined during said active operating phase;
MLP1 is said multiplier parameter determined during said active operating phase;
$RT_{MAX}$ is said maximum regeneration torque value;
$RT_{REF}$ is said reference torque value determined during said regeneration operating phase; and
MLP2 is said multiplier parameter determined during said regeneration operating phase.

10. System (1) according to claim 1, wherein said system (1) comprises at least a selection unit (11, 13, 20, 22) of said maximum current value ($I_{MAX}$, $RI_{MAX}$) of the lesser of at least a predefined maximum deliverable/absorbable current threshold value ($I_{MAX\_THR}$, $RI_{MAX\_THR}$) and at least a maximum deliverable/absorbable current dynamic value ($I_{MAX\_BMS}$, $RI_{MAX\_BMS}$) calculated according to the temperature and/or to the charge level of said electric battery (B).

11. System (1) according to claim 8, wherein said piloting signal ($T_{OUT}$) corresponds to a delivered torque value to said electric motor (E).

12. System (1) according to claim 8, wherein:
said dynamic generation means (10) comprise at least a first calculation unit (15) of at least a maximum deliverable and/or regeneration torque value ($T_{MAX}$, $RT_{MAX}$) according to said at least a maximum deliverable/absorbable current value ($I_{MAX}$, $RI_{MAX}$) by said electric battery (B), to an output voltage value ($V_B$) of said electric battery (B) and to a rotation speed value (RPM) of said electric motor (M); and
said delivered torque value is variable between said maximum deliverable torque value ($T_{MAX}$) and said maximum regeneration torque value ($RT_{MAX}$).

* * * * *